(12) United States Patent
Ginja (10) Patent No.: US 11,897,404 B2
(45) Date of Patent: Feb. 13, 2024

(54) BUMPER REINFORCEMENT FOR INTEGRATION INTO A VEHICLE FRONT ASSEMBLY, COMPRISING A SENSOR-BEARING MOUNTING PLATE

(71) Applicant: COMPAGNIE PLASTIC OMNIUM, Lyons (FR)

(72) Inventor: Stéphane Ginja, Levallois-Perret (FR)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 265 days.

(21) Appl. No.: 17/285,394

(22) PCT Filed: Sep. 30, 2019

(86) PCT No.: PCT/EP2019/076453
§ 371 (c)(1),
(2) Date: Apr. 14, 2021

(87) PCT Pub. No.: WO2020/078706
PCT Pub. Date: Apr. 23, 2020

(65) Prior Publication Data
US 2022/0063531 A1 Mar. 3, 2022

(30) Foreign Application Priority Data
Oct. 18, 2018 (FR) ...................................... 1859642

(51) Int. Cl.
*B60R 19/18* (2006.01)
*B60R 19/03* (2006.01)
*B60R 19/48* (2006.01)

(52) U.S. Cl.
CPC .............. *B60R 19/18* (2013.01); *B60R 19/03* (2013.01); *B60R 19/483* (2013.01); *B60R 2019/1833* (2013.01)

(58) Field of Classification Search
CPC ....... B60R 19/18; B60R 19/03; B60R 19/483; B60R 2019/1833
See application file for complete search history.

(56) References Cited

U.S. PATENT DOCUMENTS

2004/0080183 A1  4/2004  Andre et al.
2004/0262458 A1  12/2004  Demange et al.
(Continued)

FOREIGN PATENT DOCUMENTS

DE  202011001928 U1  4/2012
EP  1457390 A1  9/2004
(Continued)

OTHER PUBLICATIONS

WO-2019043262-A1 computer translation (Year: 2019).*
(Continued)

*Primary Examiner* — Amy R Weisberg
*Assistant Examiner* — Melissa Ann Bonifazi
(74) *Attorney, Agent, or Firm* — M&B IP Analysts, LLC (57) ABSTRACT

Bumper reinforcement produced by molding a thermoplastic material and intended to be integrated into a motor vehicle front assembly between a bumper and a technical part. The bumper reinforcement comprises at least one mounting plate that is intended to bear at least one sensor, said mounting plate being integrally formed with said bumper reinforcement and connected by its perimeter thereto via a fragile material bridge such that, in the event of a frontal impact resulting in deformation of the bumper reinforcement and impacting the mounting plate, the mounting plate detaches fully or partially from the bumper reinforcement under the effect of the rupture of the material bridge.

15 Claims, 4 Drawing Sheets

(56) References Cited

U.S. PATENT DOCUMENTS

| | | |
|---|---|---|
| 2005/0035609 A1 | 2/2005 | Cate et al. |
| 2005/0040672 A1 | 2/2005 | Andre |
| 2018/0093618 A1 | 4/2018 | Yokoyama et al. |
| 2019/0071130 A1 | 3/2019 | Ginja |

FOREIGN PATENT DOCUMENTS

| | | |
|---|---|---|
| EP | 3389071 A1 | 10/2018 |
| FR | 3061101 A1 | 6/2018 |
| FR | 3070665 A1 | 3/2019 |
| JP | 2014205473 A | 10/2014 |
| WO | 2006100379 A1 | 9/2006 |
| WO | 2016193635 A1 | 12/2016 |
| WO | 2019043262 A1 | 3/2019 |
| WO | WO-2019043262 A1 * | 3/2019 |
| WO | 2020078706 A1 | 4/2020 |

OTHER PUBLICATIONS

International Search Report of International Searching Authority for PCT/EP2019/076453, ISA/EP, Rijswijk, Netherlands, dated Jan. 6, 2020.

Written Opinion of International Searching Authority for PCT/EP2019/076453, ISA/EP, Rijswijk, Netherlands, dated Jan. 6, 2020.

* cited by examiner

BUMPER REINFORCEMENT FOR INTEGRATION INTO A VEHICLE FRONT ASSEMBLY, COMPRISING A SENSOR-BEARING MOUNTING PLATE

CROSS-REFERENCE TO RELATED APPLICATIONS

This application claims priority under 35 U.S.C. § 371 to the International Application No. PCT/EP2019/076453, filed Sep. 30, 2019, and to the French Application No. 1859642, filed Oct. 18, 2018, now pending, the contents of which are hereby incorporated by reference.

The present disclosure relates to the field of motor vehicles. In particular, the present disclosure relates to a module that is arranged at the front of a vehicle between the engine block and the front bumper.

A vehicle front assembly comprising a technical front face that supports functional elements such as a cooling system, a bumper skin, or even optical elements is already known from the prior art, particularly from document WO 2006/100379. This front assembly comprises at least one upper transverse beam for transmitting forces in the event of an impact to the side members of the vehicle positioned behind said front assembly.

French patent application no. 1758255, not published as of the filing date of the present application, describes a front monobloc module for a motor vehicle comprising a structural part composed of a transverse beam that constitutes an energy absorption system and a semi-structural part that is molded and overmolded on the structural part. The semi-structural part supports one or more of the following elements, such as the controlled air intake flaps for cooling the radiator, an air duct, an underbody deflector, an optical element, a battery charger, and/or an electronic control unit, and may itself be linked to the shielding forming the front bumper.

However, this semi-structural part is not necessarily overmolded on the structural part, and it can be regarded as an autonomous part, also known as a bumper reinforcement, and be arranged between the bumper and the technical part, and it comprises, inter alia, the engine cooling devices.

The bumper reinforcement is made by molding a thermoplastic material.

The bumper reinforcement is secured to the structural elements supporting the technical part, to the transverse beam forming the structural part, or directly to the shock absorbers (crash box). The bumper reinforcement, which comprises technical elements as mentioned previously, reduces the number of parts to be assembled by facilitating the integration of multiple functions on the same part and also makes it possible to reinforce the bumper skin by supporting the elastic deformation of the latter.

However, due to the development of modern vehicles, there is a growing need to integrate additional driving assistance elements into the front part of the vehicle. To wit, manufacturers are seeking to accommodate one or more cameras, lidars, proximity detectors, and a radar into this front part, which is relatively exposed to impacts, all these sensors being connected to a powerful on-board computer in order to make the vehicle more and more autonomous.

However, these sensors have the particularity of being fragile and relatively expensive to replace in the event of deterioration.

The nature of the crashes that the vehicle must withstand and form part of the specifications that are imposed on all manufacturers is described in standards that are known in the profession.

These specifications consider four main categories of crash, namely:

High speed-type crashes, which correspond to a frontal impact against a rigid or deformable obstacle. For a frontal crash, the vehicle speed is at least 56 km/h. The vehicle must then be designed with the objective of protecting the occupants of the vehicle.

Insurance-type crashes, at around 15 km/h against a stationary wall, such as the one known as the Danner or AZT crash, or at around 10 km/h against a deformable barrier or against a pole (ROAR bumper test, pole crashes, NHS standard), and which are addressed with the objective of limiting damage and the associated repair costs.

Small crashes, or parking-type crashes (ECE42, USPART 581), at a speed of about 4 km/h in the center and 2.5 km/h on corners, which are addressed with the objective of non-deterioration of the exterior of the bumper skin.

Regulatory pedestrian impacts (leg, femur) at around 40 km/h, which are addressed in such a way as to respect biomechanical criteria in order to limit injuries.

It is the object of the disclosed embodiments to offer a solution that makes it possible to safeguard these sensors in the event of a vehicle crash that results in denting of the front part of the vehicle, as in the case of insurance crashes, and, to the extent possible, to limit the deterioration of the sensors in the event of a higher-speed crash.

To this end, the disclosed embodiments relates to a bumper reinforcement for integration into a front assembly for a motor vehicle between the bumper and the technical part.

This bumper reinforcement is characterized in that it comprises at least one mounting plate that is intended to bear at least one sensor that is integral with said bumper reinforcement and linked by its perimeter to the latter by means of a fragile material bridge such that, in the event of a frontal crash that results in deformation of the bumper reinforcement and impacts the mounting plate, the mounting plate detaches fully or partially from the bumper reinforcement under the effect of the rupture of the material bridge.

The movement of the bumper reinforcement is dissociated from the movement of the structural elements of the front assembly. In detaching from the bumper reinforcement, the mounting plate bearing the sensors is then positioned behind the structural part, so that the sensors benefit from the protection offered by the beam forming the structural part that absorbs part of the energy of the crash by deforming.

In the event of a minor crash, such as a parking collision or a pedestrian collision, the mounting plate, which is located outside the impact zone, is not affected, and the arrangement and orientation of the sensors are unchanged.

By virtue of its configuration, the mounting plate does not create a hard point that could injure a pedestrian's leg.

The monobloc part according to the disclosed embodiments can also comprise the following features either alone or in combination:

The material bridge is formed by alternation of at least one first zone in which the material bridge has a thickness that is less than or equal to the thickness of the wall of the mounting plate and greater than or equal to an intermediate thickness that is strictly less than the thickness of the wall of said mounting plate, and at least one second zone in which the material bridge has a thickness that is less than or equal to the intermediate thickness and greater than or equal to zero thickness.

The intermediate thickness is between 0.3 mm and 0.8 mm.

The wall thickness of the mounting plate is between 2 mm and 5 mm.

The thickness of the wall of the mounting plate is substantially equal to the thickness of the wall of the bumper reinforcement.

The material bridge comprises at least one first hinge zone in which the thickness of the material bridge is equal to the thickness of the wall of the mounting plate, so that, in the event of a rupturing of the material bridge, the mounting plate remains joined with the bumper reinforcement by said first hinge zone and does not fall to the ground.

The material bridge includes a single first hinge zone and a second zone extending around the remainder of the perimeter of the mounting plate.

The first zones and the second zones extend over substantially equal lengths.

The material bridge extends on the plane of the mounting plate.

The material bridge extends in a direction perpendicular to the plane of the mounting plate.

A rear face of the mounting plate is coplanar with a front face of the bumper reinforcement.

The bumper reinforcement is preferably formed by molding a material that is selected from among the following materials: polypropylene (PP), polyethylene (PE), polyamide (PA), polycarbonate (PC), polybutylene terephthalate (PC-PBT).

The material of the bumper reinforcement is preferably reinforced with mineral fillers or with glass or carbon fibers.

The material bridge is adjusted so that the mounting plate detaches from the bumper reinforcement when the vehicle is traveling at 15 km/h and undergoes a frontal crash against a stationary wall.

The material bridge is adjusted so that the mounting plate detaches from the bumper reinforcement when the vehicle is traveling at 10 km/h and undergoes a frontal crash against a stationary post or a deformable barrier.

A mounting plate supports at least one sensor that is selected from among the following sensors: a lidar, a radar or a parking assistance camera, a night vision camera, a distance regulation radar, a parking assistance proximity sensor.

The mounting plate supports one or more protective pins that rise perpendicularly from the front face of the mounting plate toward the front of the vehicle to a height greater than the height of the nearest adjacent sensor.

The bumper reinforcement is suitable for supporting air intake devices, a bumper skin, an optical element.

The bumper reinforcement is overmolded on a structural part comprising at least one of the following elements: an impact beam, a shock absorber, an air duct, a pedestrian impact protection system.

BRIEF DESCRIPTION OF THE FIGURES

The disclosed embodiments will be better understood on reading the description which follows, given solely by way of example and with reference to the appended drawings in which.

DETAILED DESCRIPTION

Figure 1:
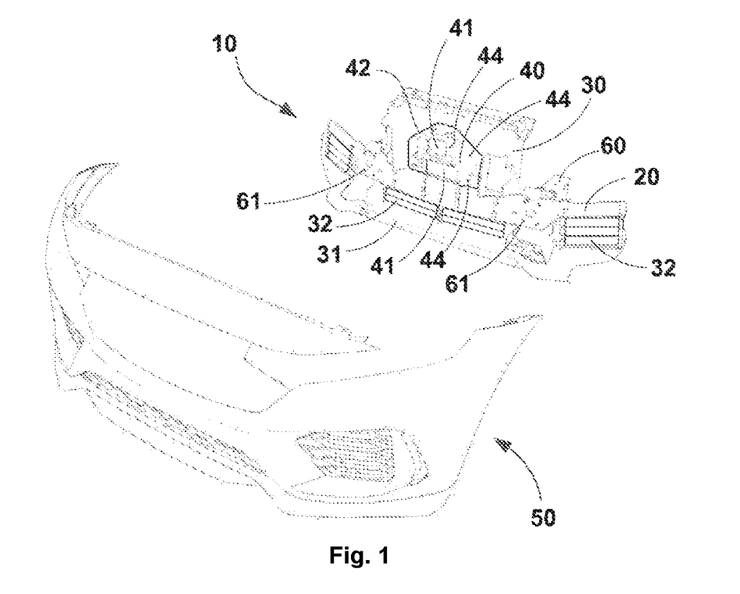
FIG. 1 is a general perspective view of a front part of a vehicle comprising a bumper reinforcement according to the disclosed embodiments invention.

FIG. 1 shows the parts that compose the front assembly, comprising a bumper 50 that is mounted on a bumper reinforcement 30, which itself is secured by fastening elements 61, for example by bolting or by riveting, to the longitudinal uprights of the vehicle by means of a box 60 that is deformable in the event of an impact (crash box).

It is also possible to make a provision for a case in which the bumper reinforcement 30 is overmolded on a structural part 20, which is composed here of a rigid beam bar made of steel or aluminum. This results in a monobloc part 10, which itself is secured to the deformable box 60 of the vehicle (crash box). This structural part 20 generally comprises an impact beam and can support an air duct, a pedestrian impact protection system, a battery charger, or even an electronic control unit (ECU).

Figure 2:
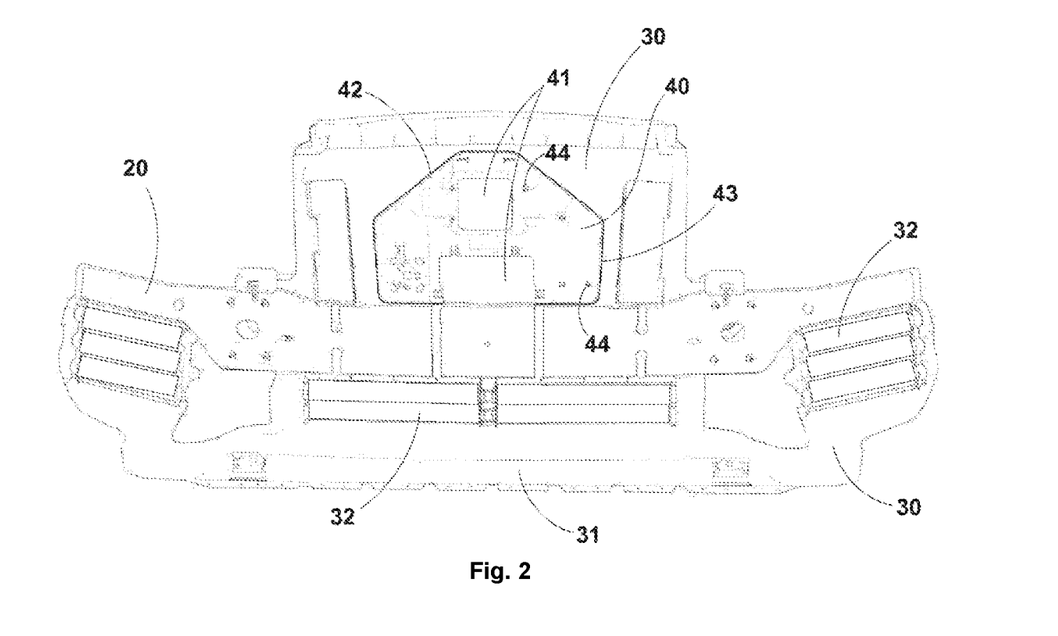
FIG. 2 is a general view of a bumper reinforcement.

FIG. 2 is in a front view from the front of the vehicle of the bumper reinforcement 30 constituting the object of the disclosed embodiments.

This bumper reinforcement 30 is preferably made of a thermoplastic material that is easily moldable by injection, such as polypropylene (PP), polyethylene (PE), polyamide (PA), polycarbonate (PC), or even polybutylene terephthalate (PC-PBT).

For reasons of strength, the material forming the bumper reinforcement 30 may contain a filler of a mineral material such as talc, or glass or carbon reinforcing fibers.

The web of material forming the bumper reinforcement has a thickness that depends on the nature and strength of the material, generally between 2 mm and 5 mm, and commonly of the order of 3 mm. This bumper reinforcement is designed to withstand the external climatic conditions encountered by the vehicle and aggressions such as sunshine or humidity.

The bumper reinforcement 30 is also designed to support the abovementioned equipment, such as air intake devices, here movable flaps 32, a bumper skin 50, or even one or more optical elements (not shown).

The bumper reinforcement 30 comprises, in its upper central part, a mounting plate 40 that is intended to receive one or more sensors 41 such as those mentioned above, namely a lidar, a proximity sensor, a radar or an assistance camera when parking, a night vision camera, a 3D camera, or even a distance regulation radar.

The mounting plate 40 is integral with and molded at the same time as the bumper reinforcement 30. The thickness $e_p$ of the wall of the mounting plate 40 is substantially equal to the thickness of the wall of the bumper reinforcement 30 itself.

It will be observed here that the bumper reinforcement serving as a support for the present description comprises a single mounting plate 40 receiving all of the sensors 41, but it is not excluded, and remains within the scope of the disclosed embodiments, to have a plurality of mounting plates, each supporting at least one sensor 41 at carefully selected locations of the bumper reinforcement 30.

The mounting plate 40 is connected to the bumper reinforcement by a material bridge 43 that extends around the entire perimeter 42 of the mounting plate 40.

This bridge of material 43, which is qualified as fragile for this purpose, is designed to break in the event of a frontal crash that results in deformation of the bumper reinforcement 30 and impacts the mounting plate 40, so that the mounting plate 40 detaches fully or partially from the bumper reinforcement 30. In other words, the breaking of the material bridge occurs before the breaking of the material forming the rest of the bumper reinforcement.

Obviously, under normal conditions of use of the vehicle, the mounting plate 40 must be sufficiently rigid to support the sensors and ensure their correct orientation and their correct geometrical positioning. The mounting plate must therefore withstand the vibrations and accelerations undergone by the vehicle, particularly when the latter is traveling on degraded pavement. Likewise, the material bridge 43 that connects the mounting plate 40 to the bumper reinforcement 30 must be strong enough to prevent the mounting plate 40 from unwanted detachment from the bumper reinforcement 30.

The material bridge 43 therefore has a thickness that is generally smaller than the thickness of the wall of the bumper reinforcement 30 or than the thickness $e_p$ of the wall of the mounting plate 40.

In practice, the material bridge is formed by alternation of at least one first zone $Z_1$ in which the material bridge 43 has a thickness $e_1$ that is less than or equal to the thickness $e_p$ of the wall of the mounting plate 40 and greater than or equal to an intermediate thickness $e_i$ that is strictly less than the thickness $e_p$ of the wall of the mounting plate ($e_i \leq e_1 \leq e_p$), and at least one second zone $Z_2$ in which the material bridge 43 has a thickness $e_2$ that is less than or equal to the intermediate thickness $e_i$ and greater than or equal to zero thickness ($0 \leq e_2 \leq e_1$).

We will therefore seek to adjust the thicknesses $e_1$ and $e_2$ in order to ensure that the mounting plate 40 detaches from the bumper reinforcement 30 in the event of an insurance-type crash at around 15 km/h against a stationary wall, such as those known as Danner or AZT crashes, or for a crash at about 10 km/h against a deformable barrier or against a post (ROAR bumper test, post crashes, IIHS standard).

In practice, for the materials forming the bumper reinforcement, the intermediate thickness $e_i$ is between 0.3 mm and 0.8 mm, (0.3 mm $\leq e_i \leq$ 0.8 mm).

This definition allows for a multitude of forms of different embodiments, all having the objective of rendering said material bridge 43 fragile.

A first embodiment of the material bridge consists in producing a material bridge comprising a first zone $Z_1$ of thickness $e_i$, as well as a second zone $Z_2$, also of thickness $e_i$. In other words, the thickness of the material bridge 43 is constant over the entire perimeter 42 of the mounting plate 40 ($e_1 = e_2 = e_i$). The thickness $e_i$ thus corresponds substantially to the maximum thickness of material beyond which a bridge of continuous material no longer meets the tearability requirements mentioned above.

Figure 3:
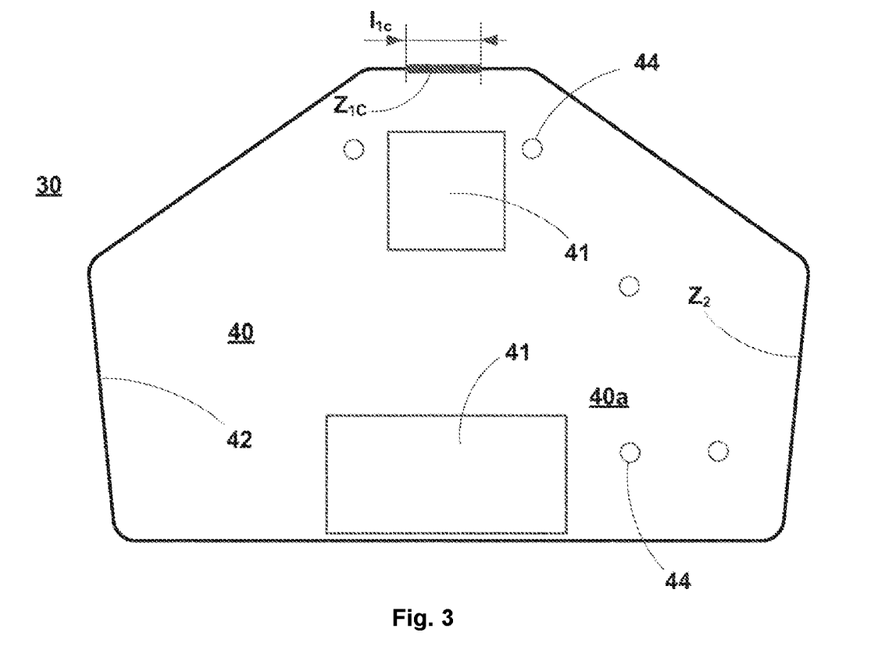
FIG. 3 shows a first alternative embodiment of the mounting plate.

With reference to FIG. 3, however, it may prove advantageous to provide at least one first zone $Z_1$ having a material bridge whose thickness $e_1$ is substantially equal to the thickness $e_p$ of the mounting plate. Indeed, it was observed during the tests that the mounting plate, after being detached from the bumper reinforcement 30, could fall on the ground and cause unwanted deterioration of the sensors. This first particular zone $Z_{1C}$ then plays the role of a hinge that is not intended to break and maintains the mounting plate 40 on the bumper reinforcement 30 while allowing it to pivot around this axis in the longitudinal direction.

The location and length $l_{1c}$, along the perimeter 42 of the mounting plate 40, of this first hinge zone $Z_{1C}$ is left to the discretion of the designer as a function of the configuration of the mounting plate and the equipment forming its immediate environment.

Figure 4:
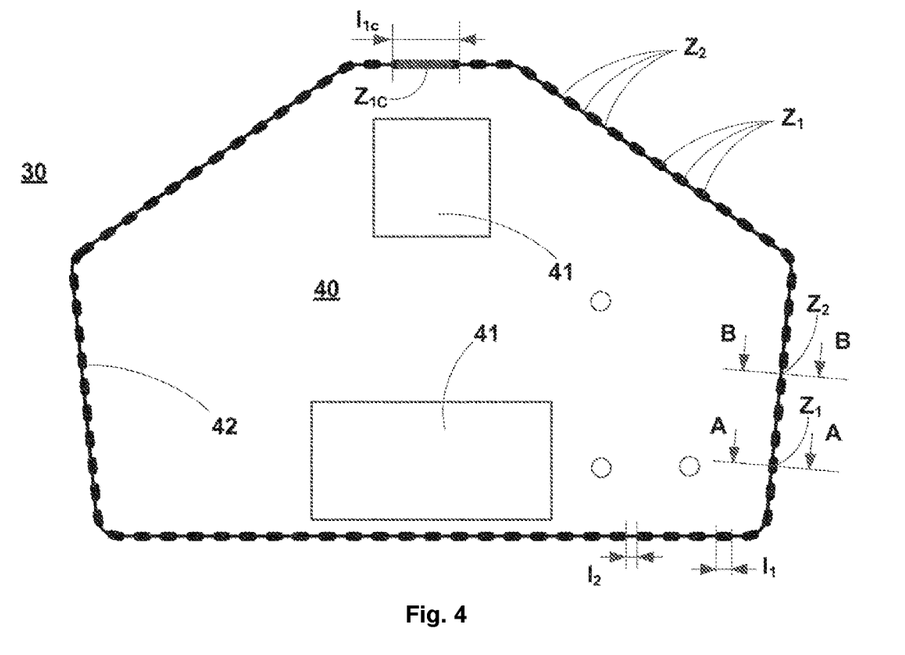
FIG. 4 shows a second alternative embodiment of the mounting plate.

FIG. 4 illustrates a more general case in which first zones $Z_1$ of greater thickness $e_1$ regularly alternate with second zones $Z_2$ of lesser thickness $e_2$.

The first and second zones $Z_1$ and $Z_2$ have substantially equal lengths $l_1$ and $l_2$ along the perimeter 42 of the mounting plate 40. A "perforated" tear-off material bridge 43 is thus obtained.

By way of example, tests have been carried out successfully for a mounting plate of thickness $e_p$ of 3 mm, comprising a bridge of material composed of first zones $Z_1$ of length $l_1$ equal to 15 mm and equal to the length $l_2$ of the second zones $Z_2$. The thickness $e_1$ of the material bridge 43 in the first zones $Z_1$ is 1.5 mm, and the thickness $e_2$ of the material bridge 43 in the second zones $Z_2$ is 0.3 mm.

Obviously, it is also possible to provide a hinge zone formed of a plurality of first zones $Z_{1C}$ of thickness $e_1$ equal to the thickness $e_p$ of the mounting plate 40, interposed with second zones $Z_2$ of small thickness $e_2$, or a single first hinge zone $Z_{1C}$ of suitable length $l_{1c}$, as shown in FIG. 4.

FIGS. 5 to 9 make it possible to illustrate, by way of example, possible variations in the construction of the material bridge 43.

The section along AA represents a section of the material bridge 43 at the level of a first zone $Z_1$, and the straight section along BB represents the section of the material bridge 43 at the level of a second zone $Z_2$.

Figure 5:
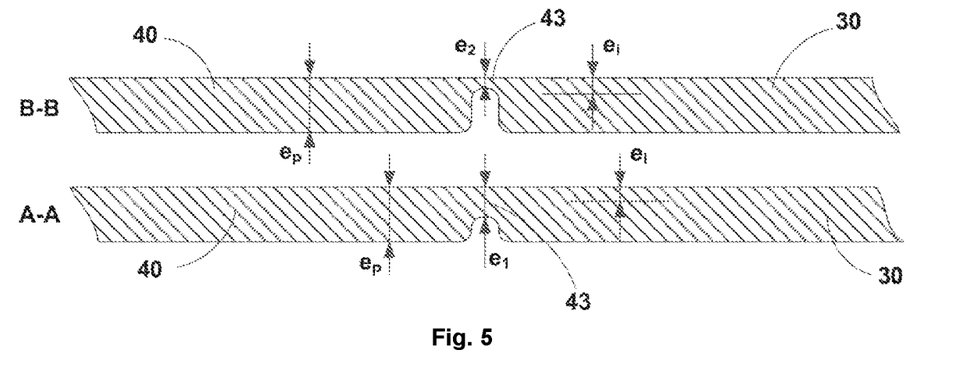
FIGS. 5 to 9 are detailed views of different combinations of embodiments of the material bridge according to the disclosed embodiments.

FIG. 5 illustrates a case in which the thickness $e_1$ of the material bridge at the level of the first zone $Z_1$ is greater than the value $e_i$ and less than the value of the thickness $e_p$ of the mounting plate. The thickness $e_2$ of the material bridge at the level of the second zone $Z_2$ is less than $e_i$ but is not zero. This case illustrates the numerical values that are given by way of example in an earlier paragraph.

Figure 6:
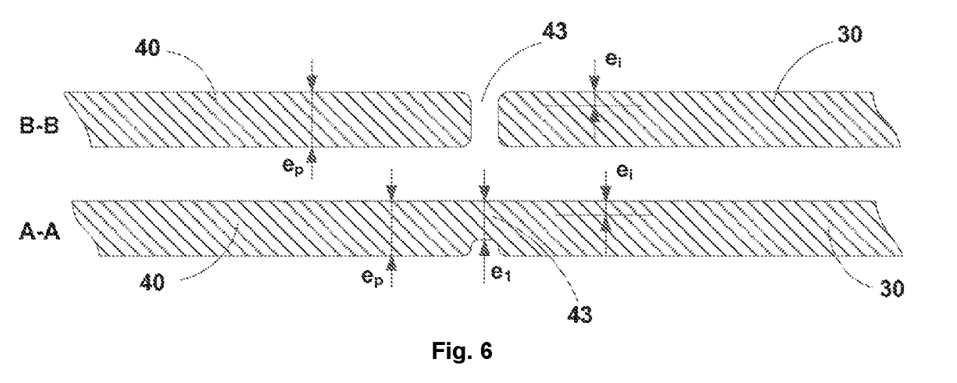

FIG. 6 illustrates a case in which the thickness $e_1$ of the material bridge 43 in the first zone $Z_1$ is greater than $e_i$ and less than $e_p$ and in which the thickness $e_2$ of the material bridge in the second zone $Z_2$ is zero.

Figure 7:
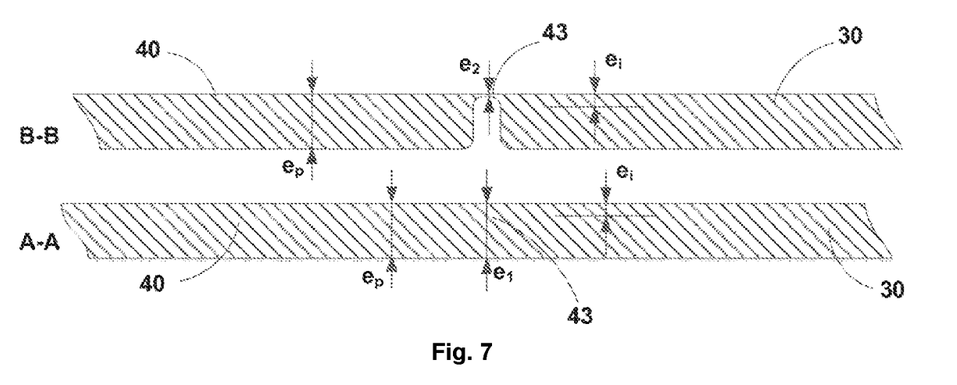

For reasons of feasibility and moldability, it may prove useful to provide a second zone $Z_2$ in which the thickness $e_2$ of the bridge of material 43 is very small, without being totally zero, as illustrated in FIG. 7.

It is then observed, logically, that the smaller the thickness $e_2$ of the material bridge 43 in the second zone $Z_2$, the greater the thickness $e_1$ of the material bridge 43 in the first zone $Z_1$, until it is equal to the thickness $e_p$ as illustrated in FIG. 7.

The material bridge illustrated in FIGS. 5 to 7 makes a provision for the latter to extend on a plane that is substantially parallel to the planes of the mounting plate 40 or of the bumper reinforcement 30.

Figure 8:
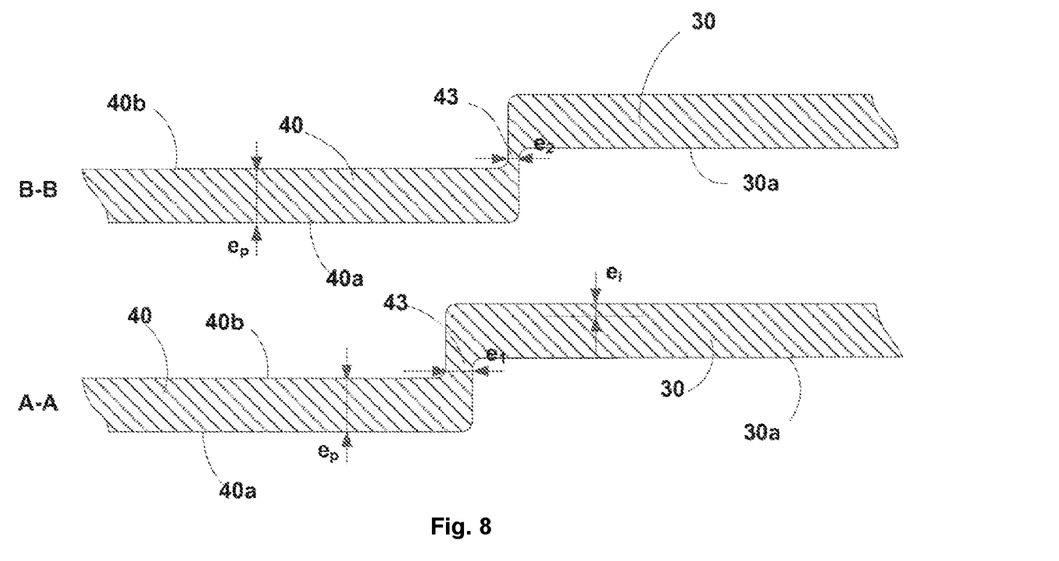
Figure 9:
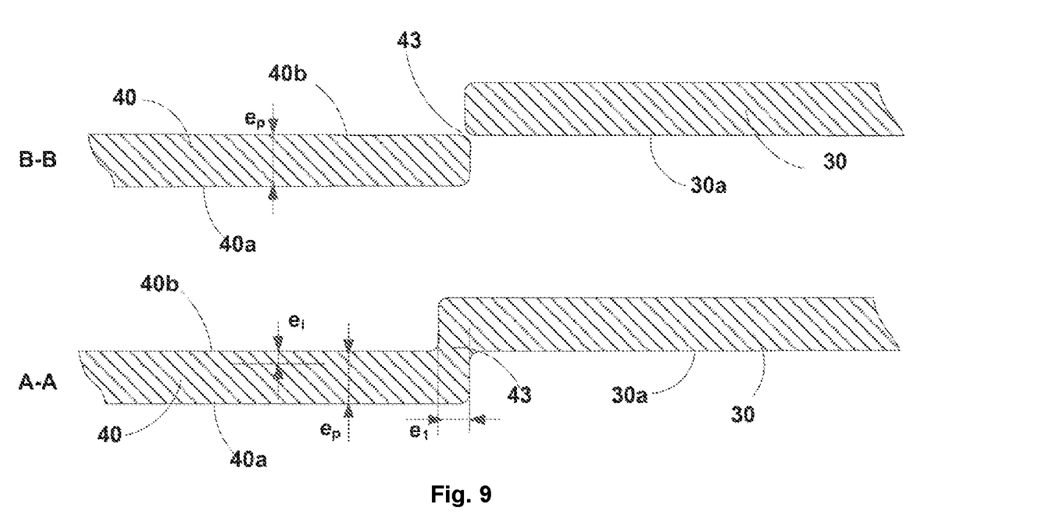

An alternative embodiment can also make a provision, particularly in order to promote the detachment of the mounting plate in the event of a side crash, that the material bridge 43 extends in a direction that is substantially perpendicular to the plane of the mounting plate 40, as illustrated in FIGS. 8 and 9.

A front face of the mounting plate 40 is denoted by the reference 40a, and a rear face of the mounting plate by the reference 40b. A front face of the bumper reinforcement 30 is denoted by 30a.

FIG. 8 illustrates a case in which the material bridge 43 has a thickness $e_1$ in the first zone $Z_1$ that is less than the thickness $e_p$ of the mounting plate and greater than the intermediate thickness $e_i$, the limit values of which remain unchanged, and a thickness $e_2$ in the second zone $Z_2$ that is less than the intermediate thickness $e_i$ and not zero.

In a longitudinal direction XX' extending from the front to the rear of the vehicle, it is observed that the rear face 40b of the mounting plate 40 is disposed in front of the front face 30a of the bumper reinforcement 30.

Still with the same objective, FIG. 9 illustrates a particular instance of the case illustrated in FIG. 8, in which the rear face 40b of the mounting plate 40 is coplanar with the front face 30b of the bumper reinforcement 30.

FIG. 9 also illustrates a case in which the thickness $e_2$ of the material bridge 43 in the second zone $Z_2$ is zero.

The disclosed embodiments are therefore not limited to the embodiments presented and, on examining the cases illustrated by the figures, those skilled in the art will be able to imagine multiple combinations without departing from the spirit of the disclosed embodiments.

For instance, it is quite possible, in particular, to produce first zones $Z_1$ having a bridge that is made of material of different thicknesses $e_1$ depending on the location of the first zone $Z_1$ on the perimeter 42 of the mounting plate 40. Likewise, the thickness $e_2$ of the material bridge in the second zones $Z_2$ may also vary according to need.

Another improvement of the disclosed embodiments consists in positioning a protective pin 44, as illustrated in FIGS. 1 to 3, or even a web, that is oriented toward the front of the vehicle in the longitudinal direction and rises perpendicularly relative to the vehicle on the plane of the mounting plate 40 so as to constitute a point of first contact serving to absorb the first impact causing the rupture of the material bridge 43 as well as to protect a sensor that is located nearby. The height of the protective pin or of the web, as measured from the front face 40a of the mounting plate, is then greater than the height of the sensor 41 that is closest to said protective pin 44. Alternatively, this protective pin can be replaced, when possible, by a rigid case in which the sensor 41 is enclosed.

NOMENCLATURE

10 Monobloc part forming a front assembly.
20 Structural part of the monobloc part/Impact beam bar.
30 Bumper reinforcement.
30a Front face of the bumper reinforcement.
31 Pedestrian impact protection system.
32 Air intake device/Controlled flaps.
40 Mounting plate.
40a Front face of the mounting plate.
40b Rear face of the mounting plate.
41 Sensor.
42 Perimeter of the mounting plate/fragile material bridge.
43 Material bridge.
44 Protective pin.
$Z_1$ First zone.
$Z_{1C}$ First hinge zone.
$Z_2$ Second zone.
$l_1$ Length of the first zone.
$l_{1c}$ Length of the first hinge zone.
$l_2$ Length of the second zone.
$e_1$ Thickness of the material bridge in a first zone.
$e_2$ Thickness of the material bridge in a second zone.
$e_i$ Intermediate thickness.
$e_p$ Mounting plate thickness.
AA Cross section of the material bridge to the right of a first zone.
BB Cross section of the material bridge to the right of a second zone.
50 Front bumper skin.
60 Crash box.
61 Fastening elements.

The invention claimed is:

1. A bumper reinforcement that is produced by molding a thermoplastic material and intended to be integrated into a front assembly for a motor vehicle between a bumper and a technical part, characterized in that the bumper reinforcement comprises at least one mounting plate for supporting at least one sensor, is integral with said bumper reinforcement, and is linked by its perimeter to bumper reinforcement by a fragile material bridge, wherein the material bridge extends in a direction perpendicular to a plane of the mounting plate, and wherein a rear face of the mounting plate is coplanar with a front face of the bumper reinforcement.

2. The bumper reinforcement according to claim 1, wherein the material bridge is formed by an alternation of at least one first zone ($Z_1$), in which the material bridge has a thickness ($e_1$) that is less than or equal to the thickness ($e_p$) of a wall of the mounting plate and greater than or equal to an intermediate thickness ($e_1$) that is strictly less than the thickness ($e_p$) of the wall of said mounting plate ($e_i \leq e_1 \leq e_p$), and at least one second zone ($Z_2$) in which the material bridge has a thickness ($e_2$) that is less than or equal to the intermediate thickness ($e_i$) and greater than or equal to zero thickness ($0 \leq e_2 \leq e_i$).

3. The bumper reinforcement according to claim 2, wherein the intermediate thickness ($e_i$) is between 0.3 mm and 0.8 mm.

4. The bumper reinforcement according to claim 2, wherein the thickness ($e_p$) of the wall of the mounting plate is between 2 and 5 mm.

5. The bumper reinforcement according to claim 4, wherein the thickness ($e_p$) of the wall of the mounting plate is substantially equal to the thickness of the wall of the bumper reinforcement.

6. The bumper reinforcement according to claim 1, wherein the material bridge comprises a single first hinge zone (Z1c) and a second zone (Z2) extending over the rest of the perimeter of the mounting plate.

7. The bumper reinforcement according to claim 6, wherein the first zones ($Z_1$) and the second zones $Z_2$) extend over substantially equal lengths.

8. The bumper reinforcement according to claim 1, wherein the material bridge extends on the plane of the mounting plate.

9. The bumper reinforcement according to claim 1, wherein said bumper reinforcement is preferably formed by molding a material that is selected from among the following materials: polypropylene (PP), polyethylene (PE), polyamide (PA), polycarbonate (PC), polybutylene terephthalate (PC-PBT).

10. The bumper reinforcement according to claim 9, wherein the material forming the bumper reinforcement is reinforced with mineral fillers or with glass or carbon fibers.

11. The bumper reinforcement according to claim 1, wherein a mounting plate supports at least one sensor that is selected from among the following sensors: a lidar, a radar or a parking aid camera, a night vision camera, a distance regulation radar, a parking assistance proximity sensor.

12. The bumper reinforcement according to claim 1, wherein said bumper reinforcement is adapted to support air intake devices, a bumper skin, a guide air, an optical element, a battery charger, and/or an electronic control unit.

13. The bumper reinforcement according to claim 1, that is overmolded on a structural part comprising at least one of the following elements: an impact beam, a shock absorber, a pedestrian impact protection system.

14. A bumper reinforcement that is produced by molding a thermoplastic material and intended to be integrated into a front assembly for a motor vehicle between a bumper and a technical part, characterized in that the bumper reinforcement comprises at least one mounting plate for supporting at least one sensor, is integral with said bumper reinforcement, and is linked by its perimeter to said bumper reinforcement by means of a fragile material bridge, wherein the material bridge is formed by an alternation of at least one first zone ($Z_1$), in which the material bridge has a thickness ($e_1$) that is less than or equal to the thickness ($e_p$) of a wall of the mounting plate and greater than or equal to an intermediate thickness ($e_i$) that is strictly less than the thickness ($e_p$) of the wall of said mounting plate ($e_i \leq e_1 \leq e_p$), and at least one second zone ($Z_2$) in which the material bridge has a thickness ($e_2$) that is less than or equal to the intermediate thickness ($e_i$) and greater than or equal to zero thickness ($0 \leq e_2 \leq e_i$), wherein the material bridge comprises at least one first hinge zone ($Z_{1c}$) in which a thickness of the material bridge is equal to a thickness ($e_p$) of the wall of the mounting plate.

15. A bumper reinforcement that is produced by molding a thermoplastic material and intended to be integrated into a front assembly for a motor vehicle between a bumper and a technical part, characterized in that the bumper reinforcement comprises at least one mounting plate for supporting at least one sensor, is integral with said bumper reinforcement, and is linked by its perimeter to said bumper reinforcement by means of a fragile material bridge, wherein the mounting plate supports one or more protective pins that rise perpendicularly from a front face (40a) of the mounting plate in a direction from the front of the vehicle to a height greater than the height of a nearest adjacent sensor.

\* \* \* \* \*